United States Patent [19]

Fujiwara

[11] Patent Number: 5,466,822
[45] Date of Patent: Nov. 14, 1995

[54] BENZIMIDAZOLOCARBOCYANINE DYE AND SILVER HALIDE PHOTOGRAPHIC MATERIAL CONTAINING SAID DYE

[75] Inventor: Toshiki Fujiwara, Kanagawa, Japan

[73] Assignee: Fuji Photo Film Co., Ltd., Kanagawa, Japan

[21] Appl. No.: 233,435

[22] Filed: Apr. 28, 1994

[30] Foreign Application Priority Data

Apr. 28, 1993 [JP] Japan .................................. 5-102930

[51] Int. Cl.$^6$ .................................................. C07D 235/02
[52] U.S. Cl. ........................ 548/305.7; 430/585; 430/588
[58] Field of Search ......................... 548/305.7; 430/585, 430/588

[56] References Cited

FOREIGN PATENT DOCUMENTS

| | | |
|---|---|---|
| 035966 | 9/1981 | European Pat. Off. . |
| 0126990 | 12/1984 | European Pat. Off. . |
| 0301508 | 2/1989 | European Pat. Off. . |
| 0302528 | 2/1989 | European Pat. Off. . |
| 0506077 | 9/1992 | European Pat. Off. . |
| 0016223 | 2/1977 | Japan ..................................... 430/585 |

OTHER PUBLICATIONS

CA65: 7071h (1965).
CA65: 9071c (1965).
CA65: 9071e (1965).

*Primary Examiner*—Thorl Chea
*Attorney, Agent, or Firm*—Sughrue, Mion, Zinn, Macpeak & Seas

[57] ABSTRACT

A benzimidazolocarbocyanine dye represented by the following general formula (I):

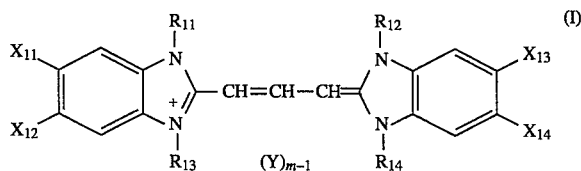

wherein $R_{11}$, $R_{12}$, $R_{13}$ and $R_{14}$ each represents a substituted or unsubstituted alkyl group; $X_{11}$, $X_{12}$, $X_{13}$ and $X_{14}$ may be the same or different and each represents a hydrogen atom, a halogen atom, an unsubstituted alkyl group, an alkoxy group, an aryloxy group, an acyl group, an acyloxy group, an alkoxycarbonyl group, a carbamoyl group, a sulfamoyl group, a hydroxy group, a cyano group or a halogen-substituted alkyl group; Y represents an ion required for balancing charge; and m represents 1 or 2, and when the compound forms an inner salt, m is 1, and a silver halide photographic material containing said dye.

10 Claims, No Drawings

BENZIMIDAZOLOCARBOCYANINE DYE AND SILVER HALIDE PHOTOGRAPHIC MATERIAL CONTAINING SAID DYE

FIELD OF THE INVENTION

This invention relates to a novel dye. It also relates to a silver halide photographic material containing said dye as a green sensitizing agent.

BACKGROUND OF THE INVENTION

Usually, silver halide photography includes the exposure stage wherein silver halide is exposed to light to form a latent image. The latent image is developed during photographic processing to form a visible image. Originally, silver halide is sensitive to light only in the spectrum region of blue light. Accordingly, the use of spectral sensitizing dyes is demanded to enlarge the sensitive wavelength region of silver halide to a longer wavelength side.

Silver halide is removed from color photographic materials by photographic processing in the case of processing color photographic materials. In the case of black-and-white photographic materials, unexposed silver halide is removed. In both cases, it is desirable that sensitizing dyes are also removed. Sensitizing dyes left behind without being removed are liable to cause a problem with regard to the formation of residual color, and hence the sensitizing dyes left behind have an adverse effect on images formed on the photographic materials. The problem of residual color grows more and more serious when the use of tabular grain emulsions and high chloride emulsions is increased. Tabular grains contained in the tabular grain emulsions have a large surface area per mol of silver and hence the addition amount of the sensitizing dyes in the grains is high. Accordingly, the residual color becomes high. Grains contained in the high chloride emulsions require the use of sensitizing dyes having enhanced absorptivity to silver halide, and the high chloride grains are often subjected to rapid processing. Accordingly, there is a possibility that the problem of residual color becomes serious.

Most of photographic films which require sensitivity to green light must be highly sensitive to light in the spectrum region of intermediate green light in the wavelength range of 540 to 555 nm (the highest sensitivity range to human eyes) for achieving sufficient sensitivity, color analysis and color reproduction. Benzimidazolocarbocyanine, oxacarbocyanine and benzimidazolooxacarbocyanine dyes are conventional spectral sensitizing dyes which absorb light in the spectrum region of green light. These dyes are disclosed in, for example, Abbott et al's U.S. Pat. Nos. 4,425,425 and 4,425,426 (reexamined No. 907), Ukai et al's U.S. Pat. No. 4,510,235, Yoshida et al's U.S. Pat. No. 4,801,526 and Ikeda et al's U.S. Pat. No. 4,837,140.

Benzimidazolocarbocyanine dyes are very effective in utilizing light energy and are highly basic. Accordingly, the dyes can be protonated and removed in processing using acidic solutions. Accordingly, residual stain is reduced. These dyes highly function as J-aggregate on the surfaces of silver halide grains. However, the benzimidazolocarbocyanine aggregates generally absorb light in the spectrum region of green light having a long wavelength of 560 to 590 nm. Accordingly, another types of dyes such as oxacarbocyanine dyes or benzimidazolooxacarbocyanine dyes must be conventionally used to conduct sensitization in the region of intermediate green light. However, since these dyes are lowly basic, the dyes are liable to be left behind at a high level which is unacceptable after processing.

SUMMARY OF THE INVENTION

Accordingly, an object of the present invention is to provide a sensitizing dye which effectively agglomerates in the spectrum region of light of 540 to 555 nm and effects sensitization and moreover, which forms residual stain only at a very low level on the photographic elements after processing.

Another object of the present invention is to provide a silver halide photographic material containing the sensitizing dye described above.

The above-described objects of the present invention have been achieved by providing a dye defined by the following items (1) to (5).

(1) A benzimidazolocarbocyanine dye represented by the following general formula (I):

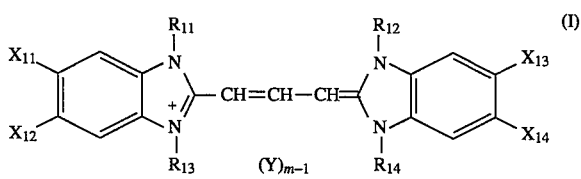

wherein $R_{11}$, $R_{12}$, $R_{13}$ and $R_{14}$ each represents a substituted or unsubstituted alkyl group; $X_{11}$, $X_{12}$, $X_{13}$ and $X_{14}$ may be the same or different and each represents a hydrogen atom, a halogen atom, an unsubstituted alkyl group, an alkoxy group, an aryloxy group, an acyl group, an acyloxy group, an alkoxycarbonyl group, a carbamoyl group, a sulfamoyl group, a hydroxy group, a cyano group or a halogen-substituted alkyl group; Y represents an ion required for balancing charge; and m represents 1 or 2, and when the compound forms an inner salt, m is 1.

(2) A benzimidazolocarbocyanine dye of general formula (I) as described in the item (1) above, wherein $R_{11}$ and $R_{12}$ each represents a substituted or unsubstituted alkyl group, provided that at least one thereof represents a substituted alkyl group.

(3) A benzimidazolocarbocyanine dye of general formula (I) as described in the item (1) above, wherein $R_{11}$ and $R_{12}$ each represents a substituted or unsubstituted alkyl group, provided that at least one thereof represents an alkoxyalkyl group, a cyanoalkyl group, an alkylthioalkyl group, an alkylcarbonylalkyl group or a fluorine-substituted alkyl group.

(4) A benzimidazolocarbocyanine dye of general formula (I) as described in the item (1) above, wherein the dye is represented by the following general formula (II):

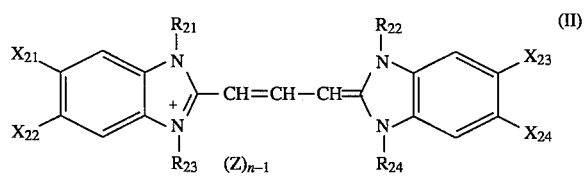

wherein $R_{21}$ and $R_{22}$ each represents a substituted or unsubstituted alkyl group, provided that at least one of $R_{21}$ and $R_{22}$ is an alkoxyalkyl group; $R_{23}$ and $R_{24}$ each represents a substituted or unsubstituted alkyl group, provided that at least one of $R_{23}$ and $R_{24}$ is a sulfoalkyl group; $X_{21}$, $X_{22}$, $X_{23}$ and $X_{24}$ may be the same or different and each represents a hydrogen atom, a cyano group, a halogen-substituted alkyl group or a halogen atom, provided that at least one of $X_{21}$ and $X_{23}$ is a hydrogen atom; Z represents an ion required for balancing charge; and n represents 1 or 2 and when the compound forms an inner salt, n is 1.

(5) A benzimidazolocarbocyanine dye of general formula (II) as described in the item (4) above, wherein $R_{21}$ and $R_{22}$ each represents a substituted or unsubstituted alkyl group, provided that at least one of $R_{21}$ and $R_{22}$ is an alkoxyalkyl group and the other is a methyl group or an ethyl group; $R_{23}$ and $R_{24}$ represents a substituted or unsubstituted alkyl group, provided that at least one of $R_{23}$ and $R_{24}$ is a sulfoalkyl group; $X_{21}$, $X_{22}$, $X_{23}$, $X_{24}$, Z and n are as defined above in the item (4).

DETAILED DESCRIPTION OF THE INVENTION

Now, the compounds of general formulas (I) and (II) will be illustrated in greater detail below.

In general formulas (I) and (II), $X_{11}$, $X_{12}$, $X_{13}$ and $X_{14}$ or $X_{21}$, $X_{22}$, $X_{23}$ and $X_{24}$ may be the same or different and each represents a hydrogen atom, a halogen atom (e.g., chlorine atom, bromine atom, fluorine atom), an unsubstituted alkyl group having 1 to 6 carbon atoms (e.g., methyl group, ethyl group, propyl group, butyl group, cyclohexyl group), an alkoxy group having 1 to 4 carbon atoms (e.g., methoxy group, ethoxy group, butoxy group), an aryloxy group having 6 to 8 carbon atoms (e.g., phenoxy group), an acyl group having 2 to 7 carbon atoms (e.g., acetyl group, propionyl group, benzoyl group), an acyloxy group having 1 to 3 carbon atoms (e.g., acetoxy group), an alkoxycarbonyl group having 1 to 8 carbon atoms (e.g., methoxycarbonyl group ethoxycarbonyl group, benzyloxycarbonyl group), a carbamoyl group having 1 to 8 carbon atoms (e.g., carbamoyl group, N,N-dimethylcarbamoyl group, morpholinocarbonyl group, piperidinocarbonyl group), a sulfamoyl group having 0 to 8 carbon atoms (e.g., sulfamoyl group, N,N-dimethylsulfamoyl group, morpholinosulfonyl group, piperidinosulfonyl group), a hydroxy group, a cyano group or a halogen-substituted alkyl group having 1 to 6 carbon atoms (e.g., trifluoromethyl group). Preferably, each is a hydrogen atom, a halogen atom, a cyano group or a halogen-substituted alkyl group having 1 to 6 carbon atoms (especially, trifluoromethyl group).

Preferably, at least one of $X_{11}$ and $X_{13}$ is a hydrogen atom. More preferably, one of $X_{11}$ and $X_{13}$ is a hydrogen atom, and the other is a halogen atom, a cyano group or a trifluoromethyl group. Preferably, at least one of $X_{21}$ and $X_{23}$ is a hydrogen atom. More preferably, one of $X_{21}$ and $X_{23}$ is a hydrogen atom, and the other is a halogen atom, a cyano group or a trifluoromethyl group.

$R_{11}$ and $R_{12}$ or $R_{21}$ and $R_{22}$ each represents a substituted or unsubstituted alkyl group. The alkyl group has 1 to 6 carbon atoms (e.g., methyl group, ethyl group, propyl group, butyl group, pentyl group, hexyl group). Examples of the substituent group portion of the substituted alkyl group include a halogen atom (e.g., chlorine atom, bromine atom, fluorine atom), a hydroxy group, an alkylthio group having 1 to 6 carbon atoms, an alkylcarbonyl group having 2 to 6 carbon atoms, a phenyl group, a cyano group, an alkoxy group having 1 to 4 carbon atoms, a carbamoyl group having 1 to 6 carbon atoms and a sulfamoyl group having 0 to 6 carbon atoms. Preferably, at least one of $R_{11}$ and $R_{12}$ or $R_{21}$ and $R_{22}$ is a substituted alkyl group. Preferred examples of the substituted alkyl group include an alkoxyalkyl group, a cyanoalkyl group, an alkylthioalkyl group, an alkylcarbonylalkyl group and a fluorine-substituted alkyl group. Most preferred is an alkoxy group-substituted alkyl group wherein the alkyl group portion has 1 to 6 carbon atoms and the alkoxy group portion has 1 to 4 carbon atoms.

$R_{13}$ and $R_{14}$ or $R_{23}$ and $R_{24}$ each represents a substituted or unsubstituted alkyl group. The alkyl group has 1 to 18 carbon atoms, preferably 1 to 7 carbon atoms, particularly preferably 1 to 4 carbon atoms. Examples of the unsubstituted alkyl group include methyl, ethyl, propyl, isopropyl, butyl, isobutyl, hexyl, octyl, dodecyl and octadecyl. Examples of the substituted alkyl group include an aralkyl group (e.g., benzyl group, 2-phenylethyl group), a hydroxyalkyl group (e.g., 2-hydroxyethyl group, 3-hydroxypropyl group), a carboxyalkyl group (e.g., 2-carboxyethyl group, 3-carboxypropyl group, carboxyethyl group, 3-carboxypropyl group, 4-carboxybutyl group, carboxymethyl group), an alkoxyalkyl group (e.g., 2-methoxyethyl group, 2-(2-methoxyethoxy)ethyl group), a sulfoalkyl group (e.g., 2-sulfoethyl group, 3-sulfopropyl group, 3-sulfobutyl group, 4-sulfobutyl group, 2-[3-sulfopropoxy]ethyl group, 2-hydroxy-3-sulfopropyl group, 3-sulfopropoxyethoxyethyl group), a sulfatoalkyl group (e.g., 3-sulfatopropyl group, 4-sulfatobutyl group), a heterocyclic ring-substituted alkyl group (e.g., (2-pyrrolidine-2-one-1-yl)ethyl group, tetrahydrofurfuryl group, 2-morpholinoethyl group), 2-acetoxyethyl group, carbomethoxymethyl group, 2-methanesulfonylaminoethyl group, and allyl group. Of these groups, a sulfoalkyl group having 1 to 7 carbon atoms, particularly preferably 1 to 4 carbon atoms is preferred. It is most preferred that at least one of $R_{13}$ and $R_{14}$ or $R_{23}$ and $R_{24}$ is substituted by one or more of these substituent groups.

Y and Z each represents an ion for balancing charge, and m and n each represents 1 or 2, and when the compound forms an inner salt, m and n are each 1.

The compounds of general formula (II) are preferred as the dyes used in the present invention. Specific examples of the benzimidazolocarbocyanine dyes which can be used in the present invention include, but are not limited to, the following dyes shown in Table 1 below.

TABLE 1

$$\begin{array}{c}\text{structure: benzimidazole-CH=CH-CH=benzimidazole with substituents } R_1, R_2, R_3, R_4, X_1, X_2, X_3, X_4\end{array}$$

| Dye | $R_1$ | $R_2$ | $R_3$ | $R_4$ | $X_1$ | $X_2$ | $X_3$ | $X_4$ |
|---|---|---|---|---|---|---|---|---|
| I-1 | $CH_2OCH_3$ | $CH_3$ | SB | SB | H | Br | Cl | $CF_3$ |
| I-2 | $C_2H_4OCH_3$ | $C_2H_5$ | SB | SB | H | $CF_3$ | Cl | $CF_3$ |
| I-3 | $C_2H_4OC_2H_5$ | $CH_3$ | SB | SB | H | $CF_3$ | Cl | $CF_3$ |
| I-4 | $C_3H_6OC_2H_5$ | $C_2H_5$ | SP | FAH | Cl | $CF_3$ | H | Br |
| I-5 | $C_2H_4OC_2H_5$ | $C_2H_5$ | SB | SB | H | $CF_3$ | Cl | $CF_3$ |
| I-6 | $C_2H_4OC_2H_5$ | $CH_2OCH_3$ | SB | SB | H | $CF_3$ | Cl | $CF_3$ |
| I-7 | $C_2H_4OC_2H_5$ | $C_2H_4OC_2H_5$ | SE | SE | H | $CF_3$ | Cl | $CF_3$ |
| I-8 | $C_2H_4OC_3H_7$ | $C_2H_5$ | SP | FA1 | Cl | $CF_3$ | H | $CF_3$ |
| I-9 | $CH_2OC_2H_5$ | $CH_3$ | SB | FA2 | H | CN | Cl | $CF_3$ |
| I-10 | $C_2H_4OC_2H_5$ | $C_2H_5$ | SB | SB | Cl | CN | H | $CF_3$ |

SE: $C_2H_4SO_3^-$
SP: $C_3H_6SO_3^-$
SB: $C_4H_8SO_3^-$
FAH: $CH_2CF_2CF_2H$
FA1: $CH_2CF_3$
FA2: $CH_2CF_2CF_3$

All dyes shown in Table 1 have a potassium counter ion. However, the counter ion is not limited to a specific counter ion, and other counter ions can be used.

The dyes of general formula (I) or (II) can be prepared by conventional methods such as the methods described in Hamer, *Cyanine Dyes and Related Compounds*, (John Wiley & Sons, New York 1964) and James, *The Theory of the Photographic Process*, 4th edition (Macmillan, New York 1977).

Though the synthesis of a specific dye is exemplified in Example 1 described hereinafter, the corresponding dyes can be prepared in the same manner as described above from compounds where the positions-5 and -6 of compound 1 are substituted by other substituent groups such as halogen, cyano, etc. shown in Table 1.

Further, the corresponding dyes can also be prepared from compounds where the positions-5 and -6 of compound 2 are substituted by other substituent groups.

Furthermore, the corresponding dyes can also be prepared from compounds where the position-1 of each of compounds 1 and 2 is substituted by other substituent groups such as those shown in Table 1.

The sensitizing dyes of general formula (I) or (II) of the present invention are used in an amount of preferably 0.1 to 1.0 mmol, more preferably 0.2 to 0.7 mmol per mol of silver halide. The optimum amounts of the dyes vary depending on the final use of the photographic materials and can be determined by conventional methods.

Silver halides such as silver bromoiodide, silver bromide, silver chloride and silver chlorobromide which are conventionally used can be used in a silver halide photographic material of the present invention.

Any type of silver halide grains can be used in the present invention without particular limitation. Since the level of residual stain formed from the dyes of the present invention is low, surface area is high and a large amount of the dye can be used. Accordingly, the dyes of the present invention can be advantageously used in combination with tabular grain emulsions which make sometimes the problem of dye stain serious. Tabular silver halide grains have two crystal faces which are substantially parallel to each other. The crystal faces are larger than other crystal faces of the grain. The tabular grain emulsions contain preferably at least 50% of grain population occupied by tabular grains satisfying AR/t>25 wherein AR is an aspect ratio and equal to D/t; D is the diameter (μm) of the grain; and t is the thickness (μm) of the grain between two crystal faces which are substantially parallel to each other. The diameter D of the grain can be determined by calculating the diameter of a circle having an area equal to the surface area of one crystal face of two crystal faces which are substantially parallel to each other. The silver halide grains may have any grain size distribution which is conventionally useful for photographic compositions. Any of poly-disperse type and monodisperse type can be used.

Silver halide grains used in the present invention can be prepared by conventional methods such as the methods described in *Research Disclosure*, Item 308119 (December 1989) (hereinafter referred to as *Research Disclosure I*) and the aforesaid *The Theory of the Photographic Process*. The method of the preparation of emulsions according to ammonia process, the method of the preparation of emulsions according to neutral or acid process and other methods known by those skilled in the art are described therein. These methods generally include that a water-soluble silver salt and a water-soluble halide are mixed in the presence of protective colloid, and temperature, pAg, pH, etc., are properly controlled during the course of the formation of silver halide grains by precipitation.

It is preferred that silver halide used in the present invention is chemical-sensitized by compounds such as gold sensitizing agents (e.g., auric sulfides) and conventional chemical sensitizing agents known in the art. Compounds and methods which are useful for the chemical sensitization of silver halide are known by those skilled in the art and are described in *Research Disclosure I* and the literature cited therein.

Silver halide may be sensitized with the dyes of general formula (I) and (II) by conventional methods such as those methods described in *Research Disclosure I*. The dyes may be added to the silver halide grain emulsions and hydrophilic colloid before the coating of the emulsions on the photographic elements (e.g., during or after chemical sensitization) or simultaneously with the coating of the emulsions. The dye/silver halide emulsions may be mixed with the dispersions of color image forming couplers immediately before coating or prior to coating (e.g., 2 hours before coating).

The sensitizing dyes may be used alone or in combination with other sensitizing dyes to provide silver halide having sensitivity to light having wavelengths other than those in the intermediate range of blue light or to supersensitize silver halide.

In a preferred embodiment, the sensitizing dyes of the present invention can be coated as a layer of the photographic element to sensitize silver halide in the photographic emulsions. The sensitizing dyes of the present invention can be substantially applied to any type of emulsions (e.g., negative functioning emulsions such as surface sensitivity emulsions of unfogged internal latent image forming emulsions, direct positive emulsions such as surface fogged emulsions and other emulsions described in *Research Disclosure I*).

Generally, the photographic emulsions contain vehicles to conduct the coating of the emulsions as the layers of the photographic elements. Examples of useful vehicles include natural materials such as protein, protein derivatives, cellulose derivatives (e.g., cellulose esters), gelatin (e.g., alkali-processed gelatin such as beef ossein or oxhide gelatin, acid-processed gelatin such as pig hide gelatin), gelatin derivatives (e.g., acetylated gelatin, phthalated gelatin) and materials described in *Research Disclosure I*. Hydrophilic water permeable colloid is also useful as the vehicle or a vehicle extender. Examples of hydrophilic colloid include synthetic polymer deflocculating agents, carriers and/or binders such as poly(vinyl alcohol), poly(vinyl lactam), acrylamide polymer, polyvinyl acetal, hydrolyzed polyvinyl acetate of alkyl or sulfoalkyl acrylate and methacrylate polymers, polyamides, polyvinyl pyridine, methacrylamide copolymers and compounds described in *Research Disclosure I*. The vehicles may be contained in the emulsions in an amount which is conventionally considered to be useful.

The emulsions may contain additives which are conventionally considered to be useful for the photographic emulsions. Examples of the additives include chemical sensitizing agents such as active gelatin, sulfur, selenium, tellurium, gold, platinum, palladium, iridium, osmium, rhenium and phosphor sensitizing agents and a combination thereof. Chemical sensitization is generally carried out at a pAg of 5 to 10, at a pH of 5 to 8 and at a temperature of 30° to 80° C. as described in *Research Disclosure*, Item 13452 (June 1975) and U.S. Pat. No. 3,772,031.

Examples of other additives include fogging agents, stabilizing agents, filter dyes, light absorbing or reflecting pigments, hardening agents (e.g., hardening agents for gelatin), coating aids, dye forming couplers, development modifiers such as development inhibitor eliminating couplers and time controlling development inhibitor eliminating couplers and bleaching accelerators. These additives can be added to the emulsions and other photographic layers by conventional methods. The addition methods are described in *Research Disclosure I* and the literature cited therein.

The emulsions may contain fluorescent brighteners such as stilbene fluorescent brighteners. The fluorescent brighteners are well known by those skilled in the art. Even when the fluorescent brighteners are not used, it is possible that when the dyes of general formula (I) or (II) are used, the formation of dye stain can be minimized. However, the fluorescent brighteners may be used to prevent dye stain from being formed.

The emulsion layers containing silver halide sensitized by the dyes of general formula (I) or (II) can be coated simultaneously with the coating of other emulsion layers, subbing layers, filter dye layers, interlayers or overcoat layers or subsequent to the coating thereof. All of these layers may contain any additives which are conventionally used for the photographic elements. Examples of the additives include anti-fogging agents, scavengers for oxidized developing agents, DIR couplers, antistatic agents, optical fluorescent brighteners and light absorbing or scattering pigments.

The photographic element layers can be coated on the supports by conventional methods. Examples of coating methods include dip coating, roller coating, reverse roll coating, air knife coating, doctor blade coating, stretch flow coating and curtain coating. The coated layers may be chill-set or dried. Both chill-setting and drying may be carried out. Drying may be accelerated by conventional methods such as conduction, convection, radiation heating or a combination thereof.

The photographic elements containing the compositions of the present invention may be a black and white photographic material or a color photographic material. The color photographic elements have generally three kinds of silver halide emulsion layers of a blue-sensitive layer combined with yellow dye forming color couplers, a green-sensitive layer combined with magenta dye forming color couplers and a red-sensitive layer combined with cyan dye forming color couplers. Dye forming couplers are well known by those skilled in the art and described, for example, in *Research Disclosure I*.

The photographic elements containing the compositions of the present invention can be processed by using conventional processing compositions such as those described in *Research Disclosure I* and James, *The Theory of the Photographic Process*, 4th edition, 1977.

Preferred embodiments of the present invention are as follows:

(1) A dye of general formula (I) or (II) where at least one of $R_{11}$ and $R_{12}$ or at least one of $R_{21}$ and $R_{22}$ is an alkoxyalkyl group (particularly ethoxyethyl group) and a silver halide photographic material containing the dye.

(2) A dye of general formula (I) or (II) where $R_{11}$ or $R_{21}$ is an alkoxyalkyl group (particularly ethoxyethyl group), $R_{12}$ or $R_{22}$ is ethyl group or methyl group, at least one of $R_{13}$ and $R_{14}$ or at least one of $R_{23}$ and $R_{24}$ is a sulfoalkyl group (particularly sulfobutyl group), and $X_{11}$ or $X_{21}$ is a hydrogen atom, and a silver halide photographic material containing the dye.

(3) A dye of general formula (I) where $R_{11}$ is ethoxyethyl group, $R_{12}$ is ethyl or methyl group, at least one of $R_{13}$ and $R_{14}$ is sulfobutyl group, and $X_{11}$ is a hydrogen atom, and a silver halide photographic material containing the dye.

The present invention is now illustrated in greater detail by reference to the following examples which, however, are not to be construed as limiting the invention in any way.

EXAMPLE 1

Synthesis of Dye I-1

In 15 ml of dimethylsulfoxide were dissolved 4-[6-chloro-1-methyl-5-trifluoromethyl-2-(2-N-acetylanilio)vinyl-3-benzimidazolio]butane sulfonate (0.005 mol) and 4-(5-bromo-1-methoxymethyl-2-methylbenzimidazolio)butane sulfonate (0.005 mol). 1,8-diazabicyclo[5,4,0]undecane-7-ene (1.0 ml, 0.015 mol) was added thereto, and the mixture was stirred at room temperature for 1 hour. A methanol solution of an excess amount of potassium acetate was added to the reaction mixture to obtain dye I-1. $\lambda_{max}$(methanol)=506 nm, $\epsilon$=1.65×10$^5$, m.p.=300° C. or higher

EXAMPLE 2

Synthesis of Dye I-2

In 15 ml of dimethylsulfoxide were dissolved 4-[6-chloro-1-ethyl-5-trifluoromethyl-2-(2-N-acetylanilio)vinyl-3-benzimidazolio]butane sulfonate (0.005 mol) and 4-(1-methoxyethyl-2-methyl-5-trifluoromethylbenzimidazolio)butane sulfonate (0.005 mol). 1,8-diazabicyclo[5,4,0]undecane-7-ene (1.0 ml, 0.015 mol) was added thereto, and the mixture was stirred at room temperature for 1 hour. A methanol solution of an excess amount of potassium acetate was added to the reaction mixture to obtain dye I-2. $\lambda_{max}$(methanol)=508 nm, $\epsilon$=1.75×10$^5$, m.p.=300° C. or higher

EXAMPLE 3

Synthesis of Dye I-3

In 15 ml of dimethylsulfoxide were dissolved 4-[6-chloro-1-methyl-5-trifluoromethyl-2-(2-N-acetylanilio)vinyl-3-benzimidazolio]butane sulfonate (0.005 mol) and 4-(ethoxyethyl-2-methyl-5-trifluoromethylbenzimidazolio)butane sulfonate (0.005 mol). 1,8-diazabicyclo[5,4,0]undecane-7-ene (1.0 ml, 0.015 mol) was added thereto, and the mixture was stirred at room temperature for 1 hour. A methanol solution of an excess amount of potassium acetate was added to the reaction mixture to obtain dye I-3. $\lambda_{max}$(methanol)=508 nm, $\epsilon$=1.68×10$^5$, m.p.=300° C. or higher

EXAMPLE 4

Synthesis of Dye I-4

In 15 ml of dimethylsulfoxide were dissolved 1,1,2,2-tetrafluoro-3-[5-bromo-1-ethyl-2-(2-N-acetylanilio)vinyl-3-benzimidazolio]propane (0.005 mol) and 4-(6-chloro-1-ethoxypropyl-2-methyl-5-trifluoromethylbenzimidazolio)propane sulfonate (0.005 mol). 1,8-diazabicyclo[5,4,0]undecane-7-ene (1.0 ml, 0.015 mol) was added thereto, and the mixture was stirred at room temperature for 1 hour. A methanol solution of an excess amount of potassium acetate was added to the reaction mixture to obtain dye I-4. $\lambda_{max}$(methanol)=505 nm, $\epsilon$=1.59×10$^5$, m.p.=300° C. or higher

EXAMPLE 5

Synthesis of Dye I-5

Compound 1 (0.005 mol) was dissolved in 15 ml of dimethylformamide. Compound 2 (0.005 mol) and 1,8-diazabicyclo[5,4,0]undecane-7-ene (1.0 ml, 0.015 mol) were added thereto. The mixture was stirred at room temperature for 30 minutes. A methanol solution of an excess amount of potassium acetate was added to the reaction mixture to obtain dye i-5. $\lambda_{max}$(methanol)=508 nm, $\epsilon$=1.66×10$^5$, m.p.=300° C. or higher

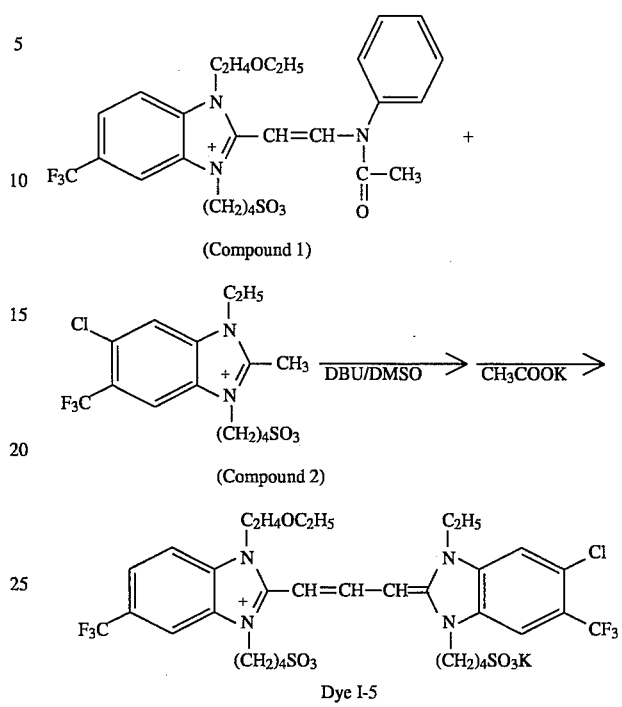

Synthesis of Dye I-5

EXAMPLE 6

Synthesis of Dye I-6

In 15 ml of dimethylsulfoxide were dissolved 4-[6-chloro-1-methoxymethyl-5-trifluoromethyl-2-(2-N-acetylanilio)vinyl-3-benzimidazolio]butane sulfonate (0.005 mol) and 4-(1-ethoxyethyl-2-methyl-5-trifluoromethylbenzimidazolio)butane sulfonate (0.005 mol). 1,8-diazabicyclo[5,4,0] undecane-7-ene (1.0 ml, 0.015 mol) was added thereto, and the mixture was stirred at room temperature for 1 hour. A methanol solution of an excess amount of potassium acetate was added to the reaction mixture to obtain dye I-6. $\lambda_{max}$(methanol)=508 nm, $\epsilon$=1.63×10$^5$, m.p.=300° C. higher

EXAMPLE 7

Synthesis of Dye I-7

In 15 ml of dimethylsulfoxide were dissolved 4-[6-chloro-1-ethoxyethyl-5-trifluoromethyl-2-(2-N-acetylanilio)vinyl-3-benzimidazolio]ethane sulfonate (0.005 mol) and 4-(1-ethoxyethyl-2-methyl-5-trifluoromethylbenzimidazolio)ethane sulfonate (0.005 mol). 1,8-diazabicyclo[5,4,0]undecane-7-ene (1.0 ml, 0.015 mol) was added thereto, and the mixture was stirred at room temperature for 1 hour. A methanol solution of an excess amount of potassium acetate was added to the reaction mixture to obtain dye I-7. $\lambda_{max}$(methanol)=506 nm, $\epsilon$=1.56×10$^5$, m.p.=300° C. or higher

EXAMPLE 8

Synthesis of Dye I-8

In 15 ml of dimethylsulfoxide were dissolved 1,1,1-trifluoro-2-[1-ethyl-6-trifluoromethyl-2-(2-N-acetylanilio)vinyl-3-benzimidazolio]ethane (0.005 mol) and 4-(6-chloro-2-methyl-1-propoxymethyl-5-trifluoromethylbenzimidazolio)propane sulfonate (0.005 mol). 1,8-diazabicyclo[5,4,0]undecane-7-ene (1.0 ml, 0.015 mol) was added thereto, and the mixture was stirred at room temperature for 1 hour. A methanol solution of an excess amount of potassium acetate was added to the reaction mixture to obtain dye I-8. $\lambda_{max}$(methanol)=506 nm, $\epsilon$=1.77× $10^5$, m.p.=300° C. or higher

EXAMPLE 9

Synthesis of Dye I-9

In 15 ml of dimethylsulfoxide were dissolved 1,1,2,2-pentafluoro-3-[6-chloro-1-methyl-5-trifluoromethyl-2-(2-N-acetylanilio)vinyl-3 -benzimidazolio]propane (0.005 mol) and 4-(6-chloro-5-cyano-2-methyl-1-ethoxymethyl-benzimidazolio)butane sulfonate (0.005 mol). 1,8-diazabicyclo[5,4,0]undecane-7ene (1.0 ml, 0.015 mol) was added thereto, and the mixture was stirred at room temperature for 1 hour. A methanol solution of an excess amount of potassium acetate was added to the reaction mixture to obtain dye I-9. $\lambda_{max}$(methanol)=515 nm, $\epsilon$=1.64×$10^5$, m.p.=300° C. or higher

EXAMPLE 10

Synthesis of Dye I-10

In 15 ml of dimethylsulfoxide were dissolved 4-[1-ethyl-6-trifluoromethyl-2-(2-N-acetylanilio)vinyl-3-benzimidazolio]butane sulfonate (0.005 mol) and 4-(6-chloro-5-cyano-1-ethoxyethyl-2-methylbenzimidazolio)butane sulfonate (0.005 mol). 1,8-diazabicyclo[5,4,0]undecane-7-ene (1.0 ml, 0.015 mol) was added thereto, and the mixture was stirred at room temperature for 1 hour. A methanol solution of an excess amount of potassium acetate was added to the reaction mixture to obtain dye I-10. $\lambda_{max}$(methanol)=518 nm, $\epsilon$=1.60×$10^5$, m.p.=300° C. or higher

EXAMPLE 11

A tabular silver bromide grain emulsion (having a grain size of 1.0 μ(in terms of the diameter of the corresponding circle)×0.15 μ) was chemical-sensitized by using 3.5 mg of potassium tetrachloroaurate, 2 mol % of iodine per mol of Ag, 3.5 mg of sodium thiosulfate and 20 mg of sodium thiocyanate, each amount being per mol of silver. The chemical-dyed tabular silver bromide grain emulsion was dyed with either 0.5 or 0.75 mmol of the dye per mol of silver to evaluate the dyes I-3 and I-5 shown in Table 1 above and comparative dyes A and B (shown below). Tetrazaindene (2.1 g per mol of Ag) as the anti-fogging agent was added. The resulting emulsion was coated on a polyethylene terephthalate support in an amount of 300 mg of gel per ft² and 200 mg in terms of silver together with 1.5% of 1,3-divinylsulfonyl-2-propanol as the spreader. Specimens were subjected to spectral exposure through a 1/50" wedge and then processed by using an automatic processor (CEPROS-M manufactured by Fuji Photo Film Co., Ltd.). The processing time was Dry to Dry 45 sec. The photographic speed was measured at a density which was higher by 0.3 then $D_{min}$. A group of specimens were incubated at 50° C. and 50% RH for one week and then reprocessed to compare the growth of fog. The results obtained are shown in Table 2 below.

Comparative Dye A

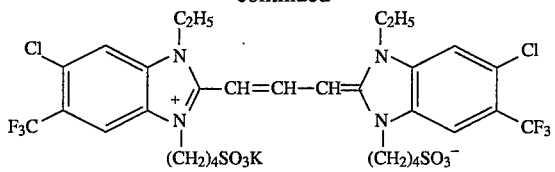

Comparative Dye B

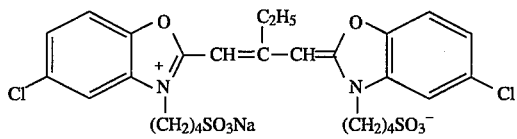

TABLE 2

| Dye | Cohesive Peak | Absorbance | Sensitivity | Stain |
|---|---|---|---|---|
| I-3 | 542 | 53.2 | 237 | 0.0 |
| I-5 | 547 | 52.2 | 221 | 0.0 |
| A | 567 | 51.0 | 225 | 0.1 |
| B | 550 | 30.0 | 180 | 0.35 |

In Table 2, the cohesive peak is the highest light absorbing wavelength of the dye adsorbed by the emulsion coat. The absorbance is % of light absorbed by the highest light absorbing wavelength of the dye in the coat. The sensitivity is defined by the sensitivity (log E×100) at $\lambda_{max}$ minus the original sensitivity (log E×100) of the dyed emulsion at 400 nm plus 200. When the sensitivity is measured, each sensitizing dye is not optimized. The comparison of spectral sensitization provided by the dyes can be made by conducting uniform chemical sensitization. The stain was measured by placing the processed films in front of a scanning spectrophotometer. The total transmission (T) of the reference sample (undyed sample) was measured between 400 nm and 900 nm. The resulting data were plotted as absorbance (-log I/T). Stain was then calculated as the maximum absorption at a given wavelength in the range obtained by the plotting.

The data shown in Table 2 demonstrate that the benzimidazolocarbocyanine dyes of the present invention agglomerate in the region of intermediate green light, and aftertreatment stain is low.

EXAMPLE 12

An aqueous solution of silver nitrate and an aqueous solution of a mixture of potassium bromide and sodium chloride containing 1.5×$10^{-7}$ mol (per mol of silver) of $K_2Rh(H_2O)Cl_5$ and 2×$10^{-7}$ mol (per mol of silver) of $K_3IrCl_6$ were added to an aqueous gelatin solution containing sodium chloride and 1,3-dimethyl-2-imidazolidinethion by the double jet process to obtain silver chlorobromide grains having a mean grain size of 0.22 μm and a silver chloride content of 70 mol %. Subsequently, a solution of 1×$10^{-3}$ mol (per mol of silver) of KI was added thereto to carry out conversion. The resulting emulsion was washed with water by conventional flocculation method. Each of the dyes I-3 and I-5 of the present invention and comparative dyes A and B was added to each emulsion. Subsequently, 40 g of gelatin per mol of silver was added to each emulsion. The pH of the emulsion was adjusted to 5.9, and the pAg thereof was adjusted to 7.3. Subsequently, 7 mg of sodium benzenethiosulfonate, 2 mg of benzenesulfinic acid, 8 mg of chloroauric acid, 200 mg of potassium thiocyanate, 3 mg of sodium thiosulfate and 3 mg of 1,1,3,3-tetramethylselenourea were added thereto, each amount being per mol of silver. The emulsion was heated at 60° C. for 45 minutes to conduct chemical sensitization, and 150 mg of 4-hydroxy-6-methyl-1,3,3a,7-tetrazaindene as the stabilizer was added thereto. Further, 100 mg of Proxel as the antiseptic was added thereto. The resulting grains were silver iodochlorobromide cubic grains having a mean grain size of 0.22 μm and a silver chloride content of 69.9 mol % (a coefficient of variation of 10%).

Each of the resulting emulsions was coated on a polyethylene terephthalate film in such an amount that the coating weight of silver was 3.0 g/m$^2$, that of gelatin was 2.5 g/m$^2$, and that of a latex copolymer of methyl acrylate/sodium 2-acrylamide-2-methylpropanesulfonate/2-acetoacetoxyethyl methacrylate (88:5:7 by weight) was 0.35 g/m$^2$. The protective layer comprising gelatin (1.0 g/m$^2$) and 1,3-divinylsulfonyl-2-propanol (0.2 g/m$^2$) as the hardening agent was coated on the emulsion layer.

The thus obtained samples were exposed to tungsten light through a step wedge, and processed at 35° C. for 30 sec by using an automatic processor (FG-680A manufactured by Fuji Photo Film Co., Ltd.) using the developing solution GR-D1 (manufactured by Fuji Photo Film Co., Ltd.) and the fixing solution GR-F1 (manufactured by Fuji Photo Film Co., Ltd). The results obtained are shown in Table 3 below.

TABLE 3

| Dye | Cohesive Peak | Absorbance | Sensitivity | Stain |
|-----|---------------|------------|-------------|-------|
| I-3 | 542 | 55.0 | 247 | 0.0 |
| I-5 | 547 | 54.8 | 237 | 0.0 |
| A | 568 | 48.3 | 217 | 0.15 |
| B | 548 | 37.6 | 182 | 0.45 |

In Table 3, the cohesive peak, the absorbance, the sensitivity and the stain are evaluated in the same manner as in Example 2.

The data shown in Table 3 demonstrate that the imidazolocarbocyanine dyes of the present invention agglomerate in the region of intermediate green light, and after-treatment stain (residual color) is low.

It will be understood from the above disclosure that the dyes of general formula (I) are effective sensitizing dyes for the silver halide photographic materials. The dyes form J-aggregates in the spectrum region of 540 to 555 nm, and the photographic materials sensitized with the dyes form dye stain (residual color) only at a very low level.

While the present invention has been described in detail and with reference to specific embodiments thereof, it is apparent to one skilled in the art that various changes and modifications can be made therein without departing from the spirit and the scope of the present invention.

What is claimed is:

1. A benzimidazolocarbocyanine dye represented by the following formula (I):

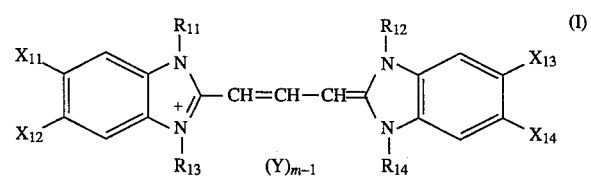

wherein $R_{11}$, $R_{12}$, $R_{13}$, and $R_{14}$ each represents an alkyl group, provided that at least one of $R_{11}$ and $R_{12}$ is a 2-ethoxyethyl group, a 2-methoxyethyl group, a 2-propoxyethyl group, an ethoxymethyl group or a methoxymethyl group and provided that at least one $R_{13}$ and $R_{14}$ is a 2-sulfoethyl group, a 3-sulfopropyl group or a 4-sulfobutyl group; one of $X_{11}$ and $X_{13}$ is a hydrogen atom, and the other of $X_{11}$ and $X_{13}$ is a halogen atom, an unsubstituted alkyl group, an acyl group, an acyloxy group, an alkoxycarbonyl group, a carbamoyl group, a cyano group or a halogen-substituted alkyl group; $X_{12}$ and $X_{14}$ may be the same or different, and each represents a hydrogen atom, a halogen atom, an unsubstituted alkyl group, an acyl group, an acyloxy group, an alkoxycarbonyl group, a carbamoyl group, a cyano group or a halogen-substituted alkyl group; Y represents an ion required for balancing charge; and m represents 1 or 2, and when the compound forms an inner salt, m is 1.

2. A benzimidazolocarbocyanine dye of formula (I) as in claim 1, wherein $R_{13}$ and $R_{14}$ each represents a sulfoalkyl group having 1 to 7 carbon atoms.

3. A benzimidazolocarbocyanine dye of formula (I) as in claim 1, wherein $R_{13}$ and $R_{14}$ each represents a sulfoalkyl group having 1 to 4 carbon atoms.

4. A benzimidazolocarbocyanine dye of formula (I) as in claim 1, wherein at least one of $R_{11}$ and $R_{12}$ represents an ethoxyethyl group.

5. A benzimidazolocarbocyanine dye of formula (I) as in claim 1, wherein $R_{11}$ represents a 2-ethoxyethyl group, a 2-methoxyethyl group, a 2-propoxyethyl group, an ethoxymethyl group or a methoxymethyl group, $R_{12}$ represents a methyl group or an ethyl group, and $X_{11}$ represents a hydrogen atom.

6. A benzimidazolcarbocyanine dye of formula (I) as in claim 1, wherein $R_{11}$ represents an ethoxyethyl group, $R_{12}$ represents a methyl group or an ethyl group, and $X_{11}$ represents a hydrogen atom.

7. A benzimidazolcarbocyanine dye of formula (I) as in claim 1, wherein one of $X_{11}$ and $X_{13}$ is a hydrogen atom, and the other of $X_{11}$ and $X_{13}$ is a halogen atom, a cyano group or a trifluoromethyl group.

8. A benzimidazolcarbocyanine dye of formula (I) as in claim 1, wherein $X_{12}$ and $X_{14}$, which may be the same or different, each represents a halogen atom, an unsubstituted alkyl group, an acyl group, an acyloxy group, an alkoxycarbonyl group, a carbamoyl group, a cyano group or a halogen-substituted alkyl group.

9. A benzimidazolcarbocyanine dye of formula (I) as in claim 1, wherein $X_{12}$ and $X_{14}$, which may be the same or different, each represents a halogen atom, a cyano group or a trifluoromethyl group.

10. A benzimidazolcarbocyanine dye of formula (I) as in claim 1, wherein $R_{11}$ is a 2-ethoxyethyl group, a 2-methoxyethyl group, a 2-propoxyethyl group, an ethoxymethyl group or a methoxymethyl group, and $X_{11}$ is a hydrogen atom.

* * * * *